(12) United States Patent
Schuster et al.

(10) Patent No.: US 12,092,009 B2
(45) Date of Patent: Sep. 17, 2024

(54) EXHAUST GAS COOLING DEVICE

(71) Applicant: TENNECO GMBH, Edenkoben (DE)

(72) Inventors: Markus Schuster, Edenkoben (DE); Philipp Gran, Edenkoben (DE); Peter Räsch, Edenkoben (DE)

(73) Assignee: Tenneco GmbH, Edenkoben (DE)

( * ) Notice: Subject to any disclaimer, the term of this patent is extended or adjusted under 35 U.S.C. 154(b) by 0 days.

(21) Appl. No.: 18/037,420

(22) PCT Filed: Nov. 24, 2021

(86) PCT No.: PCT/EP2021/082769
§ 371 (c)(1),
(2) Date: May 17, 2023

(87) PCT Pub. No.: WO2022/112296
PCT Pub. Date: Jun. 2, 2022

(65) Prior Publication Data
US 2024/0060437 A1 Feb. 22, 2024

(30) Foreign Application Priority Data
Nov. 24, 2020 (DE) .................... 10 2020 131 039.0

(51) Int. Cl.
*F01N 13/08* (2010.01)
*F01N 3/05* (2006.01)

(52) U.S. Cl.
CPC ............. *F01N 3/05* (2013.01); *F01N 13/082* (2013.01); *F01N 2410/00* (2013.01); *F01N 2470/20* (2013.01); *F01N 2470/30* (2013.01)

(58) Field of Classification Search
CPC ........ F01N 3/05; F01N 3/2892; F01N 13/082; F01N 2470/20; F01N 2470/30; F01N 2410/00; Y02T 10/12; Y02T 10/40
See application file for complete search history.

(56) References Cited

U.S. PATENT DOCUMENTS

| 2,717,049 A | 9/1955 | Langford |
| 3,899,923 A | 8/1975 | Teller |
| (Continued) | | |

FOREIGN PATENT DOCUMENTS

| DE | 3788449 T2 | 4/1994 |
| DE | 19654763 A1 | 10/1997 |
| (Continued) | | |

OTHER PUBLICATIONS

International Search Report (English and German) and Written Opinion of the ISA (German) issued in PCT/EP2021/082769, mailed Mar. 10, 2022; ISA/EP.

*Primary Examiner* — Dapinder Singh
(74) *Attorney, Agent, or Firm* — Harness, Dickey & Pierce, P.L.C.

(57) ABSTRACT

The disclosure relates to an exhaust gas cooling device for an internal combustion engine, having a housing which can be connected to an exhaust gas line of the internal combustion engine and has an axis of symmetry and having a Venturi assembly coupled to the housing for introducing exhaust gas and ambient air and having an outlet line emitting an exhaust gas-ambient air mixture into the environment, wherein: the Venturi assembly has a Venturi channel which can be coupled fluidically to the exhaust gas line and an inlet opening delimited by the Venturi channel and the exhaust gas line for ambient air; the Venturi channel is used to conduct an exhaust gas-ambient air mixture and opens, with the inlet opening, into a mixing chamber; the Venturi channel has an outlet opening and the outlet opening has an inflow opening, wherein the outlet opening and the inflow opening are spaced apart from one another; the Venturi channel and the outlet line, with the inflow opening, open into the housing.

15 Claims, 5 Drawing Sheets

(56) References Cited

U.S. PATENT DOCUMENTS

| | | | |
|---|---|---|---|
| 4,209,493 A * | 6/1980 | Olson | F01N 3/34 |
| | | | 60/308 |
| 4,579,194 A | 4/1986 | Shiki et al. | |
| 4,862,689 A * | 9/1989 | Duret | F01N 3/2053 |
| | | | 60/284 |
| 5,738,184 A | 4/1998 | Masuda et al. | |
| 8,549,850 B2 | 10/2013 | Janakiraman et al. | |
| 9,920,670 B1 * | 3/2018 | Wright | F01N 1/083 |
| 10,240,501 B2 * | 3/2019 | Sheidler | F01N 13/08 |
| 2003/0121722 A1 | 7/2003 | Crombeen | |
| 2013/0205759 A1 * | 8/2013 | Gardner | F01N 3/22 |
| | | | 60/319 |

FOREIGN PATENT DOCUMENTS

| | | |
|---|---|---|
| FR | 2139479 A5 | 1/1973 |
| GB | 915350 A | 1/1963 |
| JP | 4984505 B2 | 7/2012 |
| WO | 03069136 A1 | 8/2003 |

\* cited by examiner

EXHAUST GAS COOLING DEVICE

CROSS-REFERENCE TO RELATED APPLICATIONS

This application is a U.S. National Phase application under 35 U.S.C. 371 of International Application No. PCT/EP2021/082769, filed on Nov. 24, 2021, which claims the benefit of German Patent Application No. 10 2020 131 039.0, filed on Nov. 24, 2020, of which the entire disclosure is incorporated herein by reference.

FIELD

The relates to an exhaust gas cooling device for a hot gas source, such as an internal combustion engine or a fuel cell, the exhaust cooling device comprising a housing with an axis of symmetry connectable to an exhaust gas line of the internal combustion engine or the cell, a venturi assembly coupled to the housing for introducing exhaust gas and ambient air and an outlet line emitting exhaust gas/ambient air mixture into the environment, wherein the venturi assembly has a venturi channel connectable fluidically to the exhaust gas line and an inlet opening for ambient air delimited by the venturi channel and the exhaust gas line, wherein the venturi channel is used for guiding the exhaust gas/ambient air mixture and opens out together with the inlet opening, into a mixing chamber.

BACKGROUND

This section provides background information related to the present disclosure which is not necessarily prior art.

An exhaust gas cooling device is already known from U.S. Pat. No. 8,549,850 B2 with a venturi arrangement for supplying ambient air. The exhaust gas cooling device has a plurality of exhaust gas inlet channels and a downstream venturi duct. In addition, a plurality of inlet openings for ambient air are provided. The exhaust gas and the ambient air taken in are mixed via the venturi channel and transferred to the environment.

SUMMARY

This section provides a general summary of the disclosure, and is not a comprehensive disclosure of its full scope or all of its features.

It is the object of the disclosure to configure and arrange an exhaust gas cooling device in such a way that an improved mixing of the exhaust gas-ambient air mixture is ensured.

The object is achieved according to the disclosure in that the venturi channel has an outlet opening and the outlet line has an inflow opening, wherein the outlet opening and the inflow opening are spaced apart from one another, wherein the venturi channel and the outlet line open out, together with their inflow opening, into the housing. The outlet line is used for guiding the exhaust gas/ambient air mixture from inside the housing into a further exhaust gas line or into the environment. In this way it is achieved that the exhaust gas/ambient air mixture is guided for a longer period and over a longer path inside the housing, thus improving the intermixing before the exhaust gas/ambient air mixture is guided via the outlet line into the environment.

To this end, it can also be advantageous if the housing delimits the mixing chamber by a chamber wall, wherein the outlet opening of the venturi channel has an outlet cross-section $Q_v$ and wherein the mixing chamber for the exhaust gas/ambient air mixture exiting the venturi channel forms a flow cross-section $Q_m$, wherein the following applies: $Q_m >= f\,Q_v$, and $2 <= f <= 12$, and optionally wherein the following applies: $f=6$, $f=7$ or $f=8$. The widening of the flow cross-section reduces the flow velocity when entering the housing or the mixing chamber. This is accompanied by a longer dwelling time in the housing.

Furthermore, it can be advantageous if the outlet opening of the venturi channel and the inflow opening of the outlet line are arranged outside of an alignment. Such non-aligned configuration or the offset resulting from different arrangements of the openings increases the distance to be traveled by the exhaust gas/ambient air mixture inside the housing. The non-alignment or the offset or the arrangement relates to the respective central axis of the outlet opening and the inflow opening or the flow vector defined by the respective central axis, such as a gas discharge into a direction A and a gas intake into a direction E. Non-alignment can also be achieved in that the flow vectors have different orientations.

It can also be advantageous if the outlet opening of the venturi channel and the inflow opening of the outlet line are positioned in an alignment, wherein a deflector element is provided between the outlet opening and the inflow opening, the deflector opening effecting a deflection into a direction $R_q$ having a directional component at right angles to the gas discharge direction outlet A of the outlet opening. This is also accompanied by an increased flow path inside the mixing chamber despite the aforementioned alignment.

It can be advantageously provided that the outlet opening of the venturi channel effects a gas A discharge directed into radial direction A with respect to the axis of symmetry, and wherein the outlet line together with the inflow opening effects a gas intake in a direction E directed which is directed in parallel to the axis of symmetry. This at least ensures a 90° deflection of the gas flow and the increased flow path associated therewith.

It may be of particular importance for the present disclosure if the mixing chamber comprises an at least partially has a round cross-sectional shape Q with respect to the axis of symmetry or if vortexing means are provided on the chamber wall, wherein the gas discharging into direction A effects at least one double vortex in the mixing chamber, said at least one double vortex being directed opposite to the axis of symmetry, when the gas flow impinges on the round chamber wall or on the vortexing means. The at least one double vortex also lengthens the flow path and thus the dwelling time. The round shape of the chamber wall can include circular, oval or other round shapes. The fin-shaped or wing-shaped vortexing means may also be formed by the chamber wall or it can be an integral part of the chamber wall. A square cross-sectional shape Q of the mixing chamber is also possible, if corresponding vortexing means are provided on the chamber wall.

In connection with the configuration and arrangement according to the disclosure it may be advantageous if the venturi channel forms a mixing stage $M_v$ having a volume $V_v$ and if the mixing chamber forms a mixing stage $M_m$ having a volume $V_m$ and if the outlet line forms a mixing stage $M_a$ having a volume $V_a$, wherein for the ratio $S_1$ of $V_m$ to $V_v$ the following applies: $25 >= S_1 >= 2$, and optionally wherein the following applies: $16 >= S_1 >= 12$ and/or for the ratio $S_2$ of $V_m$ to $V_a$ the following applies: $25 >= S_2 >= 2$, and optionally wherein the following applies: $16 >= S_2 >= 12$. The relative size of the mixing chamber is also critical for the length of the obtainable flow paths of the gas flow inside the otherwise closed mixing chamber. A relatively large mixing chamber ensures relatively large or long flow paths.

It can also be advantageous if sound-absorbing means are provided inside the mixing chamber and/or upstream of the venturi assembly.

In addition, it can be advantageous if further vortexing or deflecting means are provided inside the mixing chamber. In this way the mixing is further improved.

In addition, it can be advantageous if a baffle is provided upstream of the inlet opening for ambient air or at the ambient air inlet for trapping ambient air or airflow in order to actively increase the amount of supplied ambient air.

The ambient air can also be supplied directly via the inlet opening for ambient air. In this case, the inlet opening opens to the environment. There is no need for an ambient air inlet that would have to be guided through the housing.

Furthermore, it can be advantageous if a bypass arrangement with a bypass line is provided, via which the exhaust gas can be guided past the cooling device.

Furthermore, it can be advantageous if the venturi channel and the outlet line together with the inflow opening open out into the same mixing chamber of the housing. The cooling of the exhaust gas/ambient air mixture takes place in the mixing chamber, in particular by transferring heat to the chamber wall. Immediately after cooling or flowing through the mixing chamber. The exhaust gas/ambient air mixture can be guided out of the mixing chamber via the inflow opening of the outlet line.

For this purpose, it can be advantageous if the mixing chamber is free of partition walls or housing-partition walls. This ensures an optimal flow of the exhaust gas/ambient air mixture inside the one mixing chamber. A loss of pressure associated with a partition wall or housing-partition wall is avoided. Partition walls or housing-partition walls are considered to be walls inside the mixing chamber which are provided with one or more through openings or perforations. Such walls divide the mixing chamber into two partial-mixing chambers being in flow communication.

For this purpose, it can be advantageous if the inlet opening is connected to the environment via an ambient air channel and an ambient air inlet passing through the housing, wherein the ambient air inlet is positioned in a radial direction with respect to the axis of symmetry. Thus, the inflowing ambient air experiences a radial directional component which can at least partially be deflected by the cylindrical ambient air channel in circumferential direction with respect to the axis of symmetry. The ambient air thus experiences directional components in circumferential direction and in axial direction with respect to the axis of symmetry. This ensures a first mixing of exhaust gas and ambient air in the venturi channel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further advantages and details of the disclosure are explained in the claims and in the description and shown in the figures. In the drawings:

Corresponding reference numerals indicate corresponding parts throughout the several views of the drawings.

DETAILED DESCRIPTION

Example embodiments will now be described more fully with reference to the accompanying drawings.

Figure 1A:
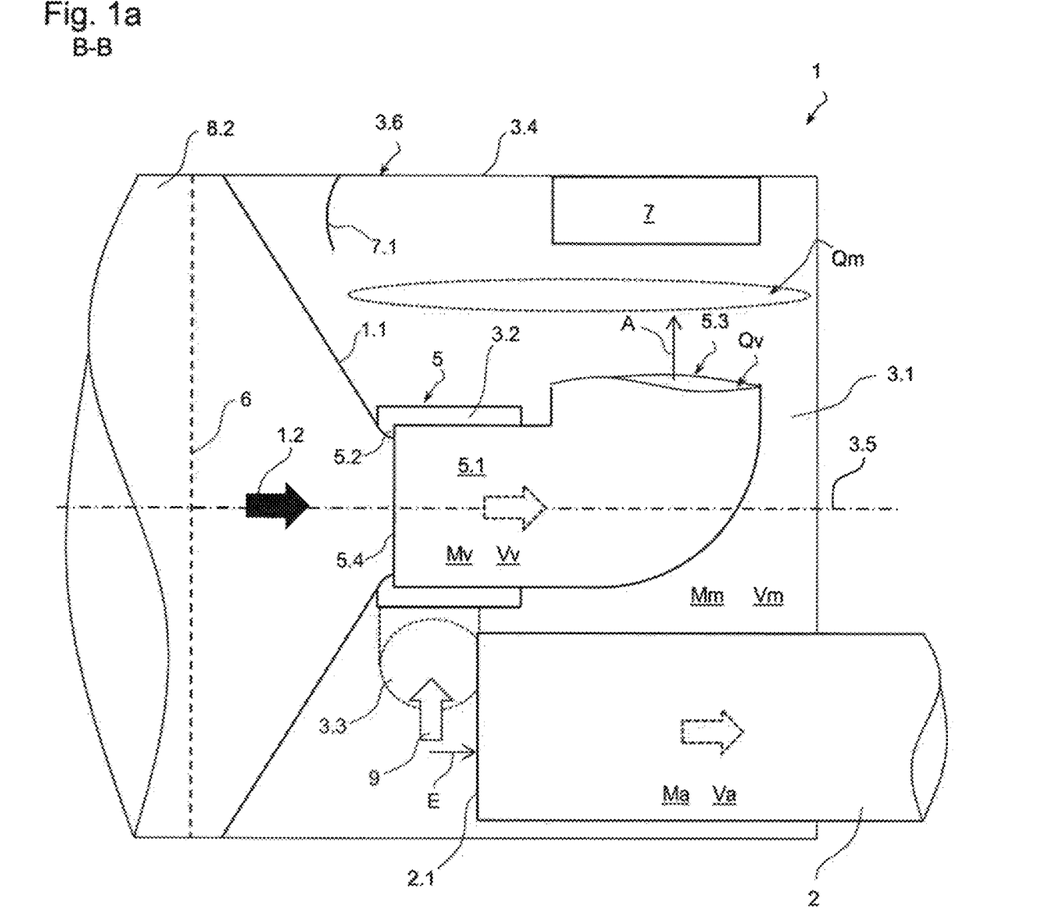
FIG. 1a shows a sectional view B-B from FIG. 2.

An exhaust gas cooling device 1 shown in FIG. 1a in sectional view B-B is coupled to an exhaust gas line 1.1 for exhaust gas 1.2. The exhaust gas line 1.1 is an outlet pipe of an exhaust gas purification system 8.2, such as a catalytic converter housing. The exhaust gas cooling device 1 has a housing 3.6 comprising a chamber wall 3.4 which delimit a mixing chamber 3.1. Inside the housing 3.6 a venturi assembly 5 is provided together with a venturi channel 5.1, which is fluidically coupled to the exhaust gas line 1.1 via an inlet opening 5.4 for exhaust gas, i.e. it is blown at. In addition, the venturi-assembly 5 comprises an inlet opening 5.2 for ambient air 9, which is delimited by the exhaust gas line 1.1 on the one hand and the venturi channel 5.1 on the other hand. The inlet opening 5.2 for ambient air 9 is connected to an ambient air channel 3.2, which circumferentially surrounds the venturi channel 5.1. The ambient air channel 3.2 is in turn coupled to the environment via an air inlet 3.3, passing through the housing 3.6, so that the ambient air 9 is passing to the inlet opening 5.2 via the ambient air inlet 3.3 and the ambient air channel 3.2. The ambient air inlet 3.3 can comprise a baffle, not shown here, for capturing ambient air.

Figure 2:
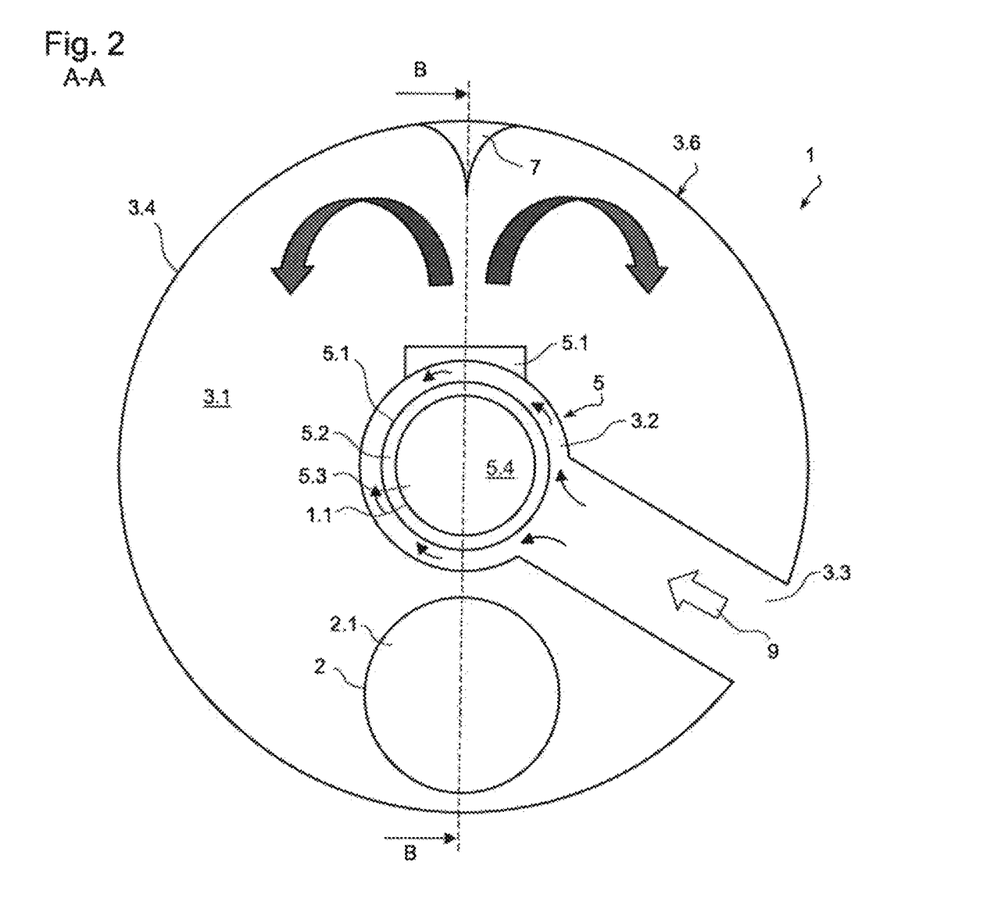
FIG. 2 shows a sectional view A-A from FIG. 3.

The venturi channel 5.1 thus guides the exhaust gas/ambient air mixture into a direction of an axis of symmetry 3.5 of the housing 3.6 or the mixing chamber 3.1, wherein the venturi channel 5.1 comprises a 90° bending at the end, so that a gas discharge A is achieved in radial direction to the axis of symmetry 3.5 via an outlet opening 5.3 of the venturi channel 5.1. As shown in FIG. 2, the exhaust gas/ambient air mixture exiting the outlet opening 5.3 meets the upper chamber wall 3.4 or a vortexing means 7 provided there, so that a counter-directed double vortex of the exhaust gas/ambient air mixture is formed due to the round cross-sectional shape Q shown in FIG. 2.

The housing 3.6 also comprises an outlet line 2 with an inflow opening 2.1, through which the exhaust gas/ambient air mixture is guided out of the housing 3.6 or the mixing chamber 3.1 outwardly or into the environment. The inflow opening 2.1 ensures that the gas intake E of the exhaust gas/ambient air mixture runs in axial direction. By means of the non-aligned or different and offset orientation of gas discharge A and gas intake E, a suitably long flow path is ensured inside the mixing chamber 3.1. The outlet opening 5.3 of the venturi channel hereby has an outlet cross-section Qv which is significantly smaller than a flow cross-section Qm, which is made available to the exhaust gas/ambient air mixture through the mixing chamber 3.1. This results in a corresponding delay of the flow velocity of the exhaust gas/ambient air mixture and thus in an increased dwelling time inside the mixing chamber 3.1.

Inside the mixing chamber 3.1 a further deflector 7.1 is also provided for deflecting the gas flow on the way to the inflow opening 2.1. Upstream of the venturi assembly 5 sound-absorbing means 6 is provided which the exhaust gas 1.2 hits immediately after leaving an exhaust gas purification system 8.2.

The exhaust gas cooling device 1 has a total of three mixing stages, the mixing stage Mv of the venturi channel 5.1 having a volume Vv, the mixing stage Mm of the mixing chamber 3.1 having a volume Vm and the mixing stage Ma of the outlet line 2 having a volume Va. In this context, the volume Vm of the mixing stage Mm is larger by a factor S1, S2, which is about 14, than the volume Vv, Va of the two other mixing stages Mv, Ma.

Figure 1B:
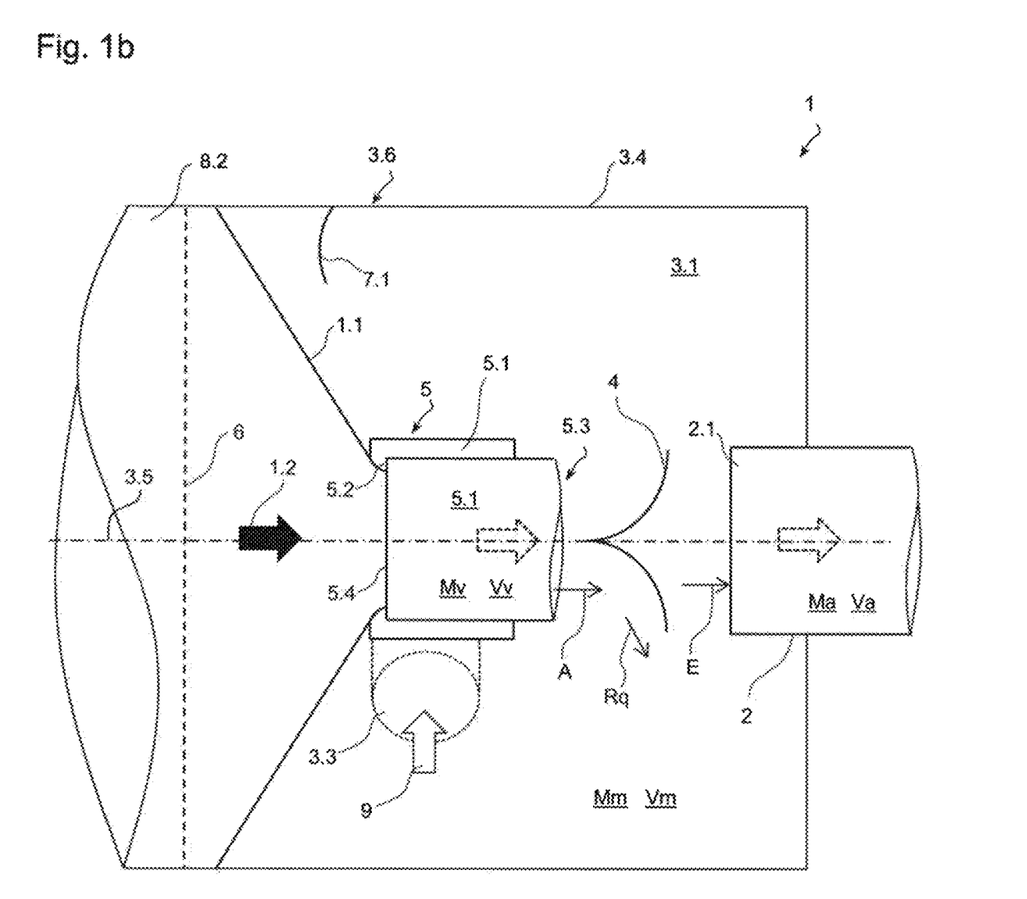
FIG. 1b shows a sectional view of an alternative embodiment.

In the embodiment according to FIG. 1b, the gas discharge and the gas intake E are oriented in the same way. Furthermore, the outlet opening 5.3 of the venturi channel and the inflow opening 2.1 of the outlet line 2 are oriented in an alignment. To avoid the inflow opening 2.1 to be directly blown at through the venturi channel 5.1, a deflector element 4 is provided, via which the gas flow is directed radially outwards into the mixing chamber 3.1, in order to complete a flow path there that is sufficiently long to ensure the desired mixing of the exhaust gas/ambient air mixture. The gas discharge A is deflected by the deflector element 4 in a direction Rq having a directional component radial to the axis of symmetry 3.5.

According to the embodiments in FIGS. 1a, 1b the mixing chamber 3.1 is free of partition walls or housing-partition walls. In an alternative, not shown embodiment, the mixing chamber 3.1 can have at least one partition wall or one housing-partition wall, which is provided with one or more through openings or perforations. Thus, the mixing chamber is divided into two partial mixing chambers being in flow connection.

Figure 3:
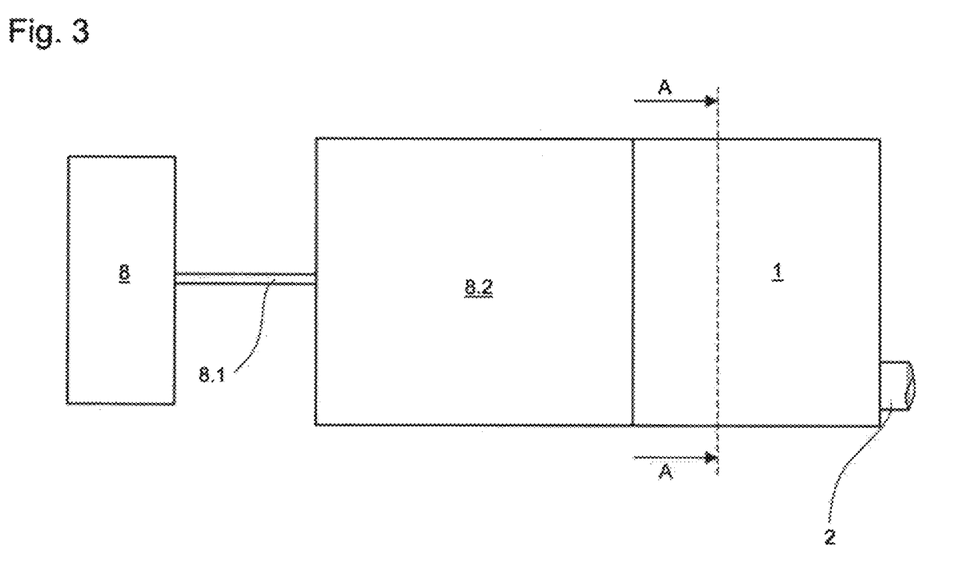
FIG. 3 shows a schematic sketch.

FIG. 3 shows the exhaust gas cooling device 1 downstream of an exhaust gas purification system 8.2. The exhaust gas purification system 8.2, in turn, is connected to an internal combustion engine 8 via an exhaust gas line section 8.1. The exhaust gas 1.2 cooled to this extent leaves the exhaust system via the outlet line 2.

FIG. 2 shows the cross-sectional view A-A from FIG. 3. It also shows section B-B for the embodiment according to FIG. 1a.

The ambient air 9 is guided via the ambient air inlet 3.3 to the ambient air channel 3.2, which surrounds the venturi channel 5.1 circumferentially so that the ambient air 9 can enter the venturi channel 5.1 via the inlet opening 5.2 between the venturi-channel 5.1 and the exhaust gas line 1.1. The exhaust gas/ambient air mixture then leaves the venturi duct 5.1 in a radially upwards direction and reaches the concave chamber wall 3.4 or the vortexing means 7 being optionally placed there so that a counter-directed double vortex is formed which in turn ensures a corresponding flow path of the exhaust gas/ambient air mixture inside the mixing chamber 3.1, before the exhaust gas/ambient air mixture is discharged outwards or to the environment via the inflow opening 2.1 of the outlet line 2.

Figure 4:
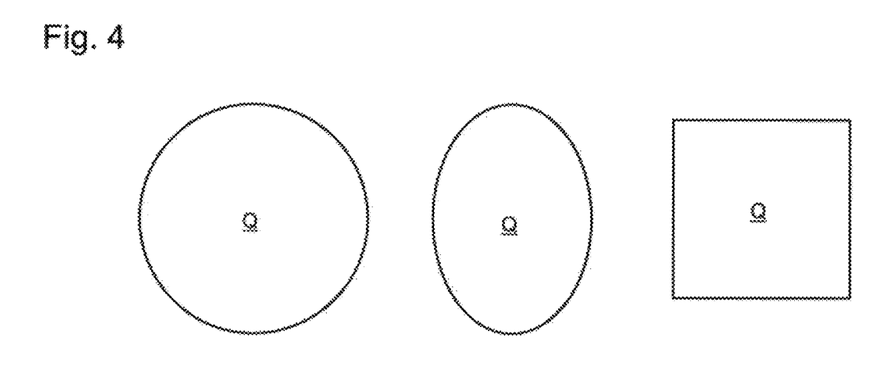
FIG. 4 shows various cross-sectional forms.

The aforementioned concave shape of the chamber wall 3.4 in the region in which the exhaust gas/ambient air mixture from the venturi channel 5.1 impinges on the chamber wall 3.4 ensures the formation of a double vortex. A concave shape is achieved by a correspondingly round or oval cross-sectional shape Q of the chamber wall 3.4, as depicted in FIG. 4. Of course, other cross-sectional forms are also possible, which ensure a corresponding formation of a double or single vortex when the gas flow impinges, so that the whole flow path, i.e. the dwelling time of the gas flow inside the mixing chamber 3.1, is increased. A square cross-sectional shape Q also as shown in FIG. 4, requires corresponding vortexing means on the chamber wall.

The inlet opening 5.2 is coupled to the environment or the ambient air 9 via an ambient air channel 3.2 and an air inlet 3.3 that is guided through the housing 3.6. The ambient air inlet 3.3 is aligned in a radial direction with respect to the axis of symmetry 3.5. It is at least partially deflected in circumferential direction with respect to the axis of symmetry 3.5 by the cylindrical ambient air duct channel 3.2 and enters the inlet opening 5.2 for ambient air 9 comprising at least one directional component in an axial direction with respect to the axis of symmetry 3.5 or in parallel to the exhaust gas 1.2.

Figure 5:
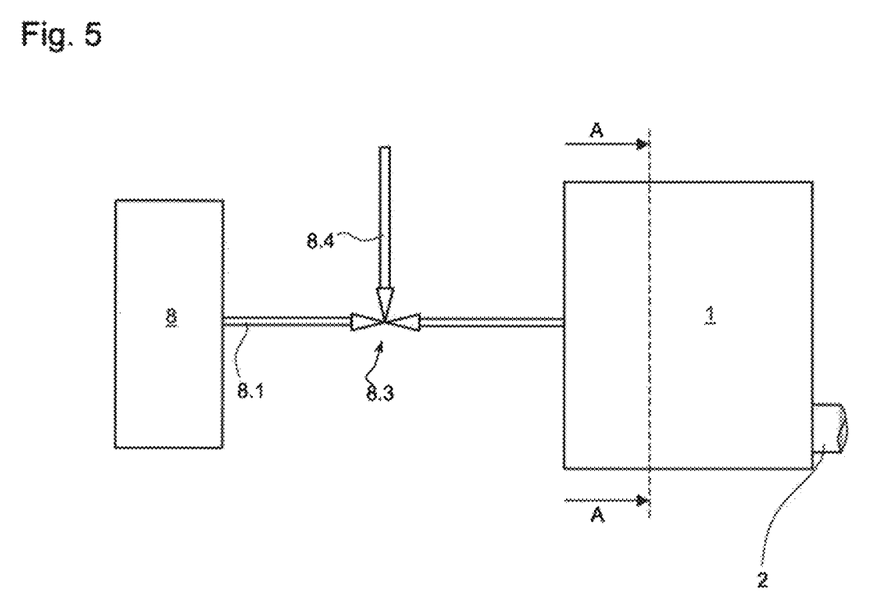
FIG. 5 shows a schematic sketch of a further embodiment.

The embodiment of the exhaust gas cooling device 1 as shown in FIG. 5 is arranged directly downstream of a hot gas source 8 such as an internal combustion engine or a fuel cell. In addition, the exhaust gas cooling device 1 comprises a bypass arrangement 8.3 having a bypass line 8.4, via which the exhaust gas can be guided past the exhaust gas cooling device 1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. An exhaust gas cooling device for a hot gas source, the exhaust cooling device comprising:
 a housing with an axis of symmetry connectable to an exhaust gas line of the hot gas source;
 a venturi assembly coupled to the housing for introducing exhaust gas and ambient air; and
 an outlet line discharging an exhaust gas/ambient air mixture into the environment,
 wherein the venturi assembly has a venturi channel fluidically coupled to the exhaust gas line and an inlet opening for ambient air which is delimited by the venturi channel and the exhaust gas line, wherein the venturi channel is used for guiding the exhaust gas/ambient air mixture and the inlet opening opens into a mixing chamber, wherein the venturi channel has an outlet opening and the outlet line has an inflow opening,
 wherein the outlet opening and the inflow opening are spaced apart from one another, and
 wherein the outlet opening of the venturi channel and the inflow opening of the outlet line are positioned within the mixing chamber in fluid communication with one another.

2. The exhaust gas cooling device according to claim 1,
 wherein the housing delimits the mixing chamber by a chamber wall,
 wherein the outlet opening of the venturi channel has an outlet cross-section Qv; and
 wherein the mixing chamber for the exhaust gas/ambient air mixture emerging from the venturi channel forms a flow cross-section Qm; and
 wherein the following applies:

$$Qm >= f \times Qv \text{ and } 2 <= f <= 10.$$

3. The exhaust gas cooling device according to claim 1, wherein the venturi channel includes a downstream end face defining the outlet opening, wherein the outlet opening of the venturi channel and the inflow opening of the outlet line are not aligned a direction parallel to the axis of symmetry.

4. The exhaust gas cooling device according to claim 1, wherein the outlet opening of the venturi channel effects a gas discharge directed in a radial direction with respect to the axis of symmetry, and wherein the outlet line effects a gas flow in parallel to the axis of symmetry.

5. The exhaust gas cooling device according to claim 1, wherein the mixing chamber comprises an at least partially round cross-sectional shape with respect to the axis of symmetry; or
   wherein vortexing means are provided on the chamber wall; and
   wherein, when gas impinges on a chamber wall of the mixing chamber or on the vortexing means, gas being discharged into a direction A effects at least one double vortex in the mixing chamber, said at least one double vortex being directed opposite to the axis of symmetry.

6. The exhaust gas cooling device according to claim 1,
   wherein the venturi channel forms a mixing stage Mv having a volume Vv;
   wherein the mixing chamber forms a mixing stage Mm with having a volume Vm;
   wherein the outlet line forms a mixing stage Ma having a volume Va; and
      wherein for a ratio S1 of Vm to Vv the following applies:

$25 >= S1 >= 2$ and/or wherein for a ratio S2 of Vm to Va the following applies:

$25 >= S2 >= 2$.

7. The exhaust gas cooling device according to claim 1, further comprising sound-absorbing means inside the mixing chamber and/or upstream of the venturi assembly.

8. The exhaust gas cooling device according to claim 1, further comprising vortexing or deflection means are provided inside the mixing chamber.

9. The exhaust gas cooling device according to claim 1, further comprising, upstream of the inlet opening for ambient air, a baffle is provided for trapping ambient air.

10. The exhaust gas cooling device according to claim 1, further comprising a bypass arrangement having a bypass line is provided.

11. The exhaust gas cooling device according to claim 1, wherein the venturi channel and the outlet line together with the inflow opening open out into the same mixing chamber of the housing.

12. The exhaust gas cooling device according to claim 1, wherein the mixing chamber is free of partition walls or housing partition walls.

13. The exhaust gas cooling device according to claim 1, wherein the inlet opening is connected to the environment via an ambient air channel and an ambient air inlet passing through the housing,
   wherein the ambient air inlet is positioned in a radial direction with respect to the axis of symmetry.

14. The exhaust gas cooling device according to claim 1, wherein the venturi channel extends parallel to the axis of symmetry.

15. An exhaust gas cooling device for a hot gas source, the exhaust cooling device comprising:
   a housing with an axis of symmetry connectable to an exhaust gas line of the hot gas source;
   a venturi assembly coupled to the housing for introducing exhaust gas and ambient air; and
   an outlet line discharging an exhaust gas/ambient air mixture into the environment;
   wherein the venturi assembly has a venturi channel fluidically coupled to the exhaust gas line and an inlet opening for ambient air which is delimited by the venturi channel and the exhaust gas line, wherein the venturi channel is used for guiding the exhaust gas/ambient air mixture and the inlet opening opens into a mixing chamber; wherein the venturi channel includes a downstream end face defining an outlet opening and the outlet line has an inflow opening;
   wherein the outlet opening and the inflow opening are spaced apart from one another; and
   wherein the outlet opening of the venturi channel and the inflow opening of the outlet line are in fluid communication with mixing chamber,
   wherein the outlet opening of the venturi channel and the inflow opening of the outlet line are positioned in an alignment; and
   wherein a deflector element is provided between the outlet opening and the inflow opening, the deflector element effecting a deflection in a direction having a direction component at right angles to a gas discharge direction of the outlet opening.

\* \* \* \* \*